(12) United States Patent
Reha et al.

(10) Patent No.: US 6,282,709 B1
(45) Date of Patent: *Aug. 28, 2001

(54) SOFTWARE UPDATE MANAGER

(75) Inventors: Mark Keith Reha; Charles F. Morris, both of San Jose, CA (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,020

(22) Filed: Nov. 12, 1997

(51) Int. Cl.$^7$ .................................................. G06F 9/45
(52) U.S. Cl. ............................................. 717/11; 717/1
(58) Field of Search ....................... 395/712; 717/1, 717/11

(56) References Cited

U.S. PATENT DOCUMENTS

| | | | |
|---|---|---|---|
| 5,155,847 | * 10/1992 | Kirouac et al. | 395/200.51 |
| 5,491,820 | * 2/1996 | Belove et al. | 395/600 |
| 5,495,610 | 2/1996 | Shing et al. | 395/600 |
| 5,581,764 | 12/1996 | Fitzgerald | 395/703 |
| 5,619,716 | 4/1997 | Nonaka et al. | 395/800 |
| 5,732,275 | * 3/1998 | Kullick et al. | 395/712 |
| 5,752,042 | 5/1998 | Cole et al. | 395/712 |
| 5,809,287 | * 9/1998 | Stupek, Jr. et al. | 395/500 |
| 5,845,077 | * 12/1998 | Fawcett | 395/200.51 |
| 5,845,090 | * 12/1998 | Collins, III et al. | 395/200.51 |
| 5,845,128 | * 12/1998 | Noble et al. | 395/712 |
| 5,859,969 | * 1/1999 | Oki et al. | 395/200.3 |
| 5,862,325 | * 1/1999 | Reed et al. | 395/200.31 |
| 5,870,610 | * 2/1999 | Beyda | 717/11 |
| 5,905,492 | * 5/1999 | Straub et al. | 345/333 |
| 5,974,461 | * 10/1999 | Goldman et al. | 709/224 |
| 5,983,270 | * 11/1999 | Abraham et al. | 709/224 |

FOREIGN PATENT DOCUMENTS

0677809A1   10/1995  (EP) ............................... G06F/9/445

OTHER PUBLICATIONS

Berzins. Software Merge. Sermantics of Combining Changes to Programs. ACM Transactions on Programming Languages and Systems. vol. 16, No. 6. pp. 1875–1903, Nov. 1994.*

* cited by examiner

Primary Examiner—Mark R. Powell
Assistant Examiner—Wei Zhen
(74) Attorney, Agent, or Firm—John F. Vodopia

(57) ABSTRACT

A method and apparatus for checking/updating existing software on a user's computer utilizes a graphical user interface (GUI). The GUI enables the user, without knowing what software exists on the computer, to download a text file from a remote server and check whether the software on the remote server is contained on the user's computer. The user can also download and automatically install a new or updated program via the GUI.

25 Claims, 4 Drawing Sheets

SOFTWARE UPDATE MANAGER

TECHNICAL FIELD

The present invention relates to software and more particularly to updating software.

BACKGROUND ART

Software application programs that utilize increased graphics have become more prevalent. For example, video games and business software often utilize an increasing amount of two dimensional (2-D) and three dimensional (3-D) graphics. In order to support the increased graphics component of these programs, the user's video display driver software has become increasingly more complex.

However, as the graphics component of software applications increases, the user's display driver software is often unable to support the increased graphics and becomes obsolete. In order to run the more complex graphic applications, the display driver software must be replaced or updated.

Software vendors often release updated versions of existing software in order to support new features or fix bugs in the software. For example, a manufacturer of display driver software may release a new version of their display driver that supports more complex 2-D and 3-D graphics applications. However, users are often unaware of new versions of software that may be available. Hence, existing users may have to rely on the particular software vendor contacting the users directly to notify them of the updated software.

Alternatively, many vendors release information regarding new software revisions, and often the actual revisions, via an on-line mechanism such as a Website on the Internet. A drawback with such on-line releases is that many users are unaware of the information available from a vendor's Website. Another drawback with releasing software updates from Websites is that they assume a fairly sophisticated user. First, the user must be able to find the vendor's Website and then be able to identify the particular version of the program that is currently running on the personal computer (PC). Next, the user must be able to determine whether the software on the PC is "down rev", i.e. an older version of the program than currently available. Finally, the user must be able to navigate through an often complex series of steps to download and install the software on the PC's hard drive. The problem with such an approach is that many users are unsophisticated and are unable to perform these steps. A further problem is that many users are unwilling to download any software onto the hard disk for fear that the new software will cause the system to crash.

SUMMARY OF THE INVENTION

There exists a need for a mechanism that allows user to conveniently determine whether software currently running on a computer is up-to-date.

There is also a need for a mechanism that provides a simple way in which software updates and new software can be downloaded to a user's computer.

These and other needs are met by the present invention, where a method and apparatus for checking/updating software is provided. In accordance with the invention, a graphical user interface (GUI) provides a computer user a simple way to determine whether the computer has the most recent version of a particular software component. The user then has the choice to download and install any new software versions via the GUI.

According to one aspect of the invention, a method for checking software programs stored on a computer system is provided. The method includes downloading a file that contains a list of software components from a remote server. The method also includes selecting at least one of the software components from the list of software components. The method further includes checking the selected software component(s) to determine whether the selected software component is the same version of software stored on the computer system.

Another aspect of the present invention provides a computer-readable medium that includes stored sequences of instructions that are executed by a processor. The instructions cause the processor to download a file containing a list of software components from a remote server. The instructions also cause the processor to check a selected software component to determine whether the selected software component is the same version of software stored on the computer system.

Other objects and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF DRAWINGS

Reference is made to the attached drawings, wherein elements having the same reference numeral designations represent like elements throughout.

DETAILED DESCRIPTION OF ILLUSTRATED EMBODIMENTS

The present invention will be described with the example of a client/server connection existing over the Internet. It will become apparent, however, that the present invention is also applicable to other networks, such as any LAN, WAN or intranet, as described in detail below.

HARDWARE OVERVIEW

Figure 1:
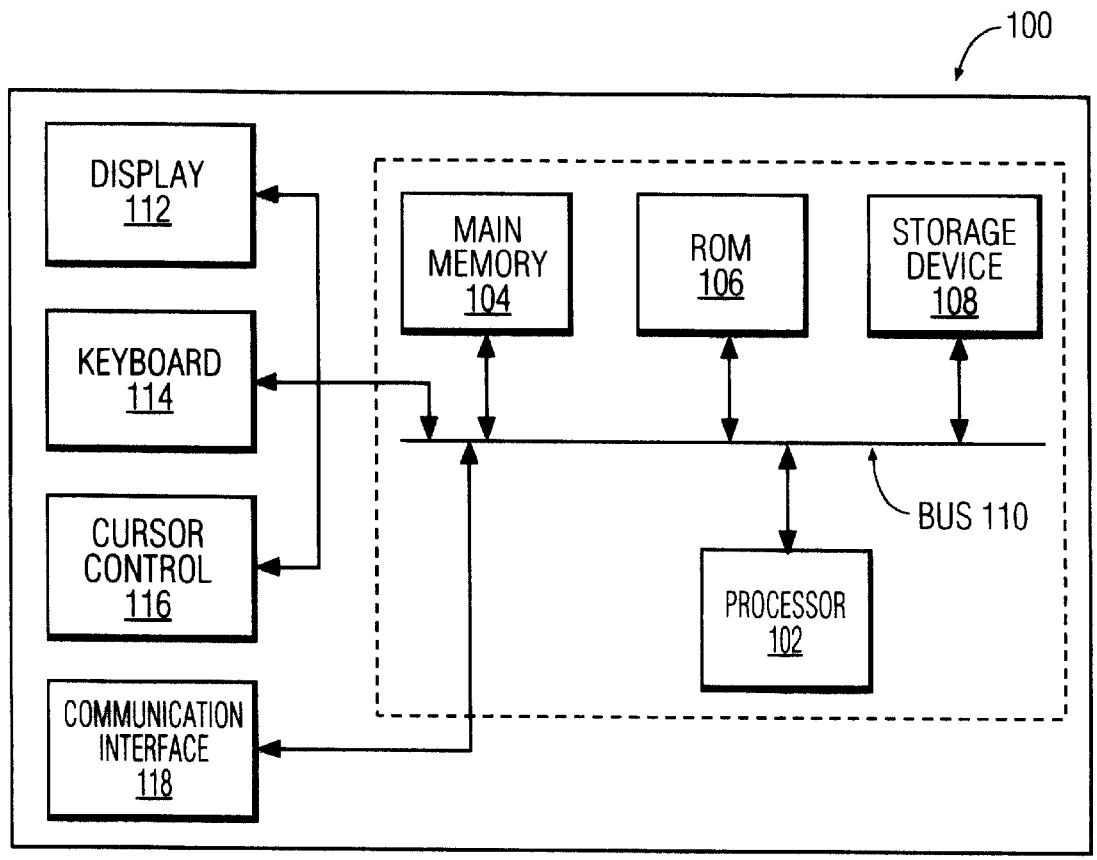
FIG. 1 is a block diagram of an exemplary computer system upon which the present invention can be implemented.

FIG. 1 is a simplified block diagram of a computer system 100 upon which an embodiment of the present invention can be implemented. Computer system 100 includes a bus 110 or other communication medium for communicating information, and a processor 102 coupled to bus 110 for processing information. Computer system 100 further comprises a random access memory (RAM) or other dynamic storage device 104 (referred to as main memory), coupled to bus 110 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 110 for storing static information and instructions for processor 102. A data storage device 108, such as a magnetic disk or optical disk and its corresponding disk drive, can be coupled to bus 110 for storing information and instructions.

Computer system 100 includes display device 112 coupled to bus 110. Display device may be a cathode ray tube (CRT) for displaying information to a computer user. Computer system 100 further includes a keyboard 114 and a cursor control 116, such as a mouse.

Computer system 100 also includes communication interface 118 connected to bus 110. Communication interface 118 enables computer system 100 to communicate with other devices/systems via any communications medium. For example, communication interface 118 may be a modem or an Ethernet interface to a LAN. Alternatively, communication interface 118 can be any other interface that enables communications between computer system 100 and other devices/systems.

The present invention is related to the use of computer system 100 to update software residing on computer system 100. According to one embodiment, software checking/updating is performed by computer system 100 in response to processor 102 executing sequences of instructions contained in memory 104. Such instructions may be read into memory 104 from another computer-readable medium, such as data storage device 108. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

Figure 2:
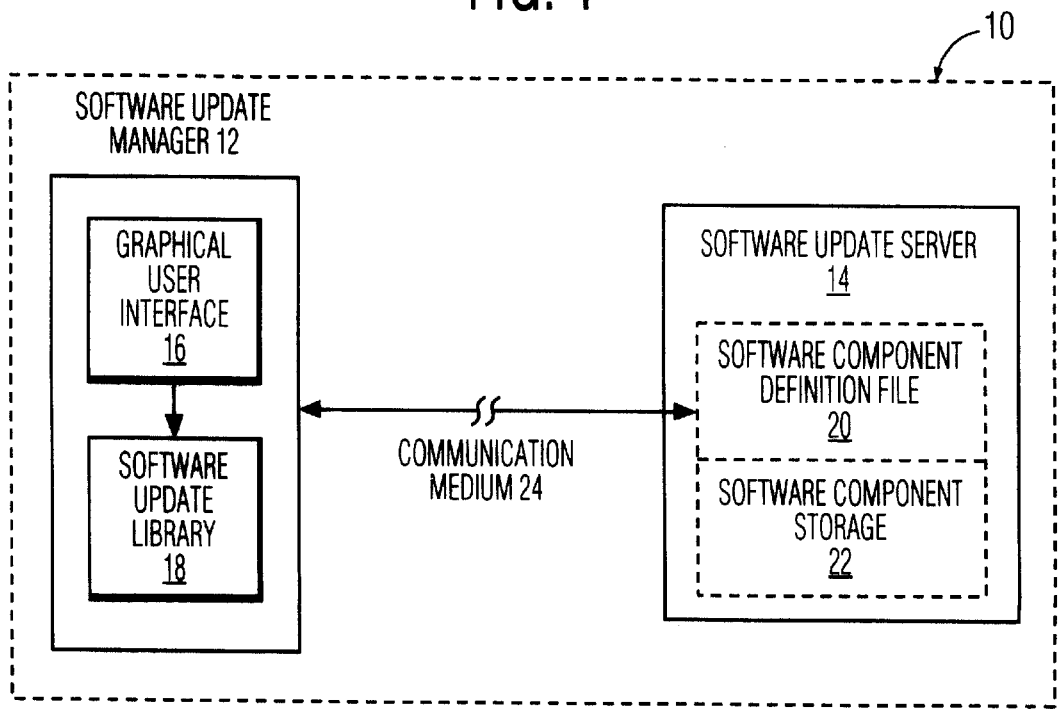
FIG. 2 is a block diagram of the software update system according to one embodiment of the invention.

FIG. 2 is a simplified block diagram of software update system 10 in accordance with the present invention. Software update system 10 includes software update manager 12 and software update server 14. The software update manager 12 resides on computer system 100, referred to as the client side and software update server 14 resides on the server side. In the exemplary embodiment, communications medium 24 is the Internet. However as discussed earlier, communications medium 24 can also be any LAN, WAN or intranet connection.

Software update manager 12 includes two main components, graphical user interface (GUI) 16 and software update library 18. In the exemplary embodiment, the software update manager 12 is configured as a Microsoft Windows™ compatible application program and computer system 100 is a typical PC. However, the software update manager 12 can be designed to be compatible with any particular operating system software and any particular computer system 100, as described earlier.

Software update server 14 includes a software component definition file 20 and software component storage 22. The software component definition file 20 may be created via any well known text editor and supports communications with software update manager 12 to provide a convenient way for an original equipment manufacturer (OEM) to distribute software component files of their choice over the Internet.

Software component definition file 20 contains a list of software component files that are currently the most recent versions of the various software components. In the exemplary embodiment, the software component definition file 20 also contains the history of the various software components. For example, the software component definition file 20 may contain the name and latest version number of a particular vendor's display driver software, as well as version numbers and dates of previous versions of the display driver software.

Since the software component definition file 20 is a simple text file, software update manager 12 supports communications with any number of hardware independent software update servers 14. For example, one OEM may set up a software update server 14 on one type of server and a second OEM may set up a software update server 14 on a different type of hardware server. However, since the software component definition file 20 is configured as a simple text file, software update manager 12 is hardware independent and can support communications with both the first and second update servers. In this manner, software update manager 12 can communicate with various software update servers 14 without requiring any special hardware by either the user or the various OEMs.

Figure 3:
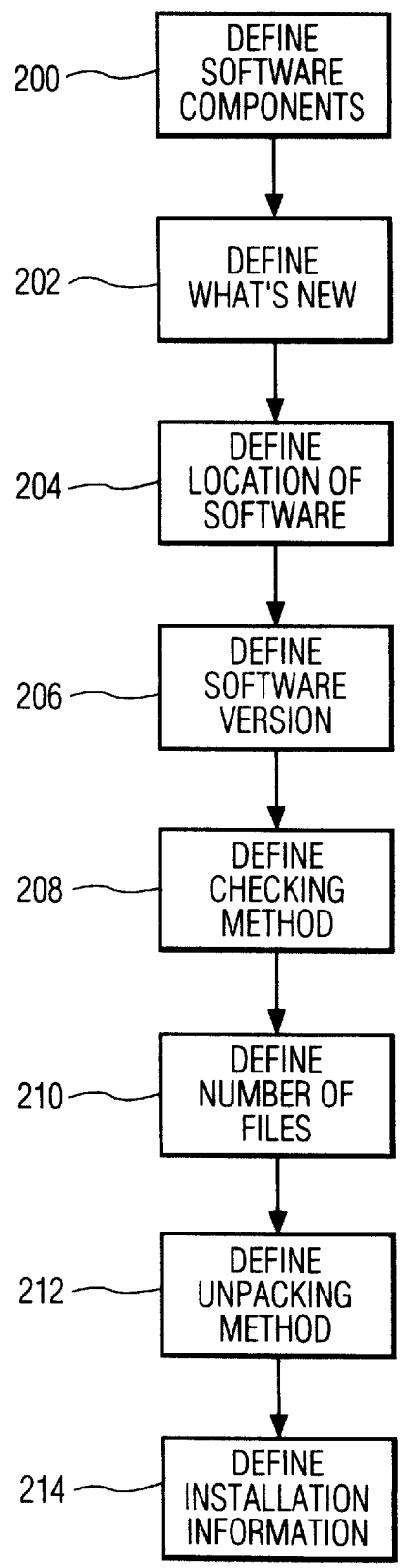
FIG. 3 is a flow diagram illustrating the steps used to create the software update definition file in accordance with an embodiment of the invention.

FIG. 3 is a simplified flow diagram illustrating the method of configuring the software component definition file 20 in accordance with the invention. As discussed earlier, the software component definition file 20 is created via any text editor.

The particular software components that exist on the server are defined at step 200. For example, the software update server 20 may provide software files for an OEM such as Philips Semiconductors™ Multimedia PC Group (MPC). Therefore, a list of the particular software components contained on the Philips Semiconductors™ MPC software update server 14 are defined at step 200.

A "What's New" text file is then defined at step 202 for each of the software components listed in step 200. In the exemplary embodiment, the What's New text file describes the history of the particular software component. For example, this file may include information regarding all the previous versions of the particular component including version number and date of release. At step 204, the location of each software component on the software update server 14 is defined, for example by identifying the subdirectory from the file transfer protocol (ftp) root for each software component. All of the software component files including the previous version of the software components are stored in software component storage 22.

Next at step 206, the version of each software component is defined. This step includes identifying the OEM's product version for the latest release of each particular software component. At step 208, the version checking method for the software component files is defined. This step includes defining the number of files to be version checked, the version checking method and version checking method parameters.

For example, the version checking method can include any of the following: 1) check local file(s) size and time and date stamp; 2) check version resource embedded in the file; 3) compare a string contained within a specified entry in the systems registry; 4) compare a string specified in the initialization file, or any other method used to compare software files to determine if a particular program exists and is current.

In method 1 (check local file(s) size, time and date stamp), processor 102 compares the file size, time and date stamp for a software component from software component definition file 20 to the file size, time and date for the corresponding file(s) stored in computer system 100. The file size is a typically formatted as a 32-bit number, the time is formatted as string HH:MM:SS, where HH represents hours, MM represents minutes and SS represents seconds. The date is the file modification date and is formatted as string DD/MM/ YYYY where DD represents day, MM represents month and YYYY represents year. Processor 102 extracts the above information from software component definition file 20 and compares the information to the same information for the corresponding file(s) stored in computer system 100 to determine if the software versions are the same. For example, if the file size is different, computer system 100 contains a down rev version of the software component.

In method 2 (version resource checking), processor 102 checks the version resource structure embedded in the software file. Generally, in a Windows™ application program, a version resource is include in the file. The version resource structure file version obtained from software component definition file 20 is used as a string comparison for determining whether the version on computer system 100 is current.

In method 3 (Register entry), processor 102 allows a specified entry within the system's registry to be used as a comparison for determining the version on computer system 100 is current.

In method 4 (Initialization entry), processor 102 allows a specified initialization file section item to be used as a basic string comparison for determining the version on computer system 100 is current.

Any one of the above methods provides a way to determine whether various software components exist and whether the software resident on computer system 100 is up-to-date. Alternatively, any other method of comparing files in order to determine whether the files are the same may be used in the invention. Additionally, each of the above methods first determines whether a file corresponding to a software component from the software component definition file 20 exists on computer system 100. This enables software update manager 12 to determine whether new software components are available from software update server 14.

Next at step 210, the number of files that are to be downloaded for each software component are defined. For example, software component 1 may include two files and software component 2 may include four files. At step 212, the manner in which each software component will be unpackaged is defined. For instance, the software component files could be packaged as self-extracting zip files that may require the files to be executed before the software component can be installed. Alternatively, if no unpacking is required, each of the individual files defined in step 210 will be downloaded separately.

At step 214, the manner in which each software component will be installed is defined. For example, installing the software component may require running a specified installation file or executing a self-extracting installation file.

Described above has been the steps for an OEM to setup software update server 14 to support distribution of software over the Internet. When an OEM produces an update to a software component, the software update definition file 20 is updated to indicate the new software version. Generally, this includes updating the What's New information at step 202, modifying the software component version at step 206 and copying the software files to software component storage 22. However, the new software update may require performing any one or all of steps 200–214, depending on the various parameters of the new software component. Similarly, when an OEM adds a new software component to the software update server 14, the software component definition file 20 is modified via a text editor to include the new software component, by the procedure illustrated in FIG. 3.

Optionally, a software tool may be utilized to manage and maintain software update server 14. This tool enables the person responsible for managing and maintaining software update server 14 to disregard various concerns about text formats (commas, spaces, etc.) in software component definition file 20. The tool provides the person maintaining software update server 14 a simple way via text prompts to enter new version information and new software files. The tool automatically formats the software update definition file 20, stores the new version and archives the old version in software component storage 22.

In the manner discussed above, individual OEMs can setup a software update server 14 to support the software update manager 12 and distribute the software components of their choice over the Internet. As discussed earlier, various OEMs may already distribute software over the Internet. However, the user is often unable to navigate through complex operations required to download the software or even be able to determine if the software on computer system 100 is outdated.

Software update manager 12 provides a simple, convenient way for a user to determine whether software components installed on the user's computer system 100 need to be updated and determine whether new components are available. Software update manager 12 also provides a simple way to update the software on the computer system 100, if necessary.

Software update manager 12 includes a graphical user interface (GUI) 16 that facilitates the software update procedure. In the exemplary embodiment, GUI 16 contains simple to use icons that give the user a straightforward, simple way to check and update software. In alternative embodiments, a user interface could be configured with various text prompts to update the software instead of, or in combination with graphical icons. Additionally, in the exemplary embodiment, GUI 16 is displayed on display 112.

Software update library 18 operates with GUI 16 to provide the processes necessary to check/update the user's software. In the exemplary embodiment, software update library 18 resides on storage device 108 and provides the instructions for processor 102 to perform the checking/ updating of the software. The user does not have to understand the processes occurring internally to accomplish the task of updating the software. Further, the user does not have to know the location of an OEM's Website or the versions of various software running on computer system 100 in order to perform the required steps to check/update the software.

Figure 4:
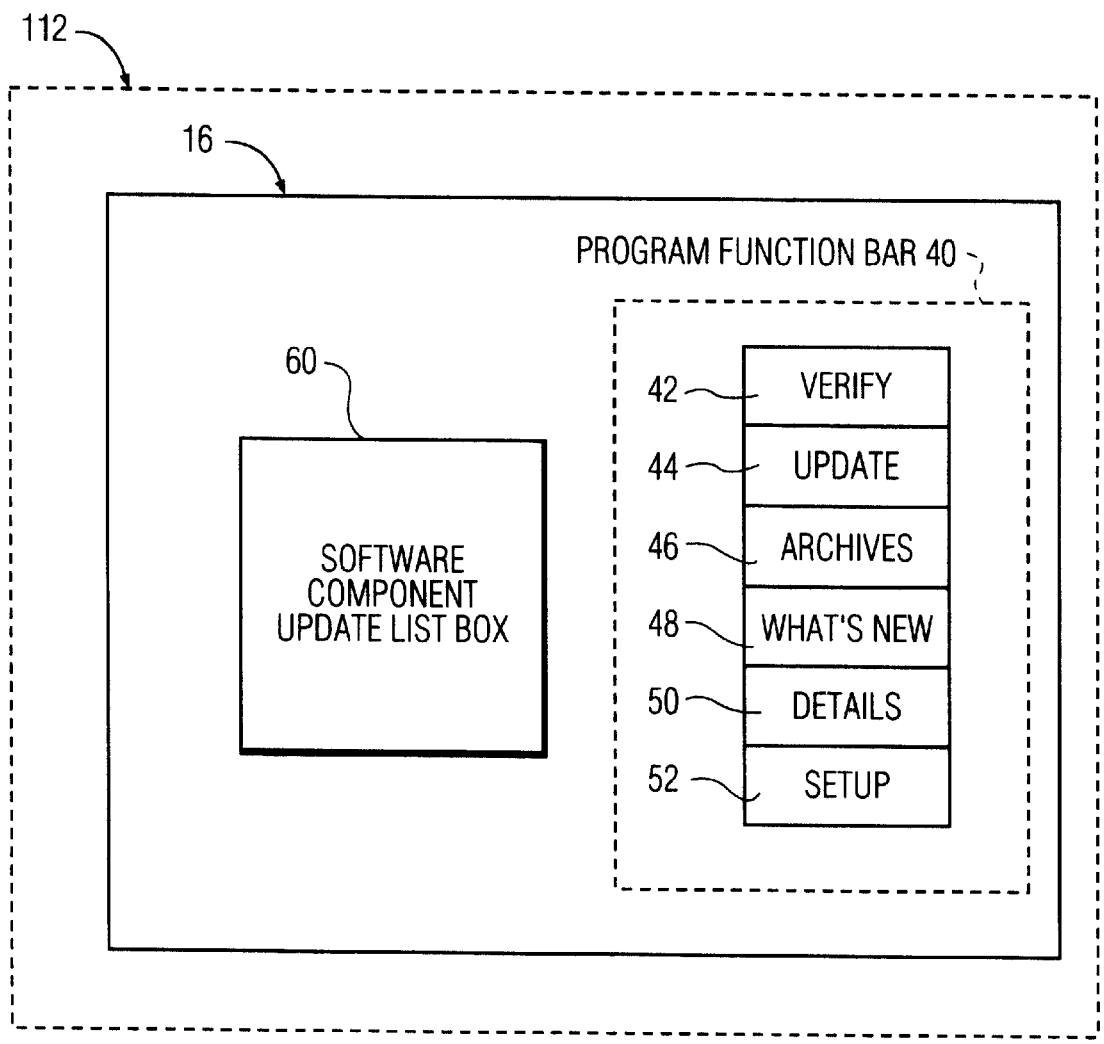
FIG. 4 illustrates the graphical user interface in accordance with an embodiment of the invention.

FIG. 4 is an exemplary interactive GUI 16 used in accordance with the invention. The programming steps used to create GUI 16 and software update library 18 will not be described as such programming steps can be determined by one of ordinary skill in the art from the functions described herein.

GUI 16 contains program function bar 40 and a software component update list box 60. In the exemplary embodiment, program function bar 40 contains the following buttons: VERIFY 42, UPDATE 44, ARCHIVES 46, WHAT'S NEW 48, DETAILS 50 and SETUP 52. However, additional buttons may be added, alternate buttons may be substituted or certain buttons may be deleted without departing from the concept of the invention.

Described in detail below are the functions performed by each button when the button is activated. The buttons may be activated via a routine mouse operation (position cursor on button and click the mouse) or via the keyboard (position cursor on button and press "Enter").

Verify button 42 performs the verification between the remote software components located on software update server 14 and local software components residing on the user's computer system 100. Verification includes determining whether a software component is down rev (older version of software than currently available) or simply not installed, as determined from software component definition file 20. The user will be prompted to specify which software components to verify or to verify all software components by selecting an option in the Setup menu, discussed in detail below. After connecting with a selected software update server 14, typically via a standard modem connection described below, any software components that require updating or are not installed on computer system 100 are listed in software component update list box 60 and can then be selected by the user for updating.

Update button 44 performs the function to update/install a new software component displayed in the software component update list box 60. This function is enabled once the Verify function has been performed and by selecting the desired software component(s) from software component update list box 60. Selecting the desired component is accomplished via cursor control 116 or keyboard 114.

Archives button 46 performs the function to display a list of archived versions for each of the software components located on software update server 14. The archived software can be downloaded to storage device 108 and can be used to install a previously released version of a software component.

Archives button 46 may be especially useful in situations where the new software contains bugs and does not work properly with computer system 100. For example, a new version of a display driver may cause a video game to run improperly (i.e. graphics don't work) or have a negative impact somewhere else. In such situations, the user may go back to the previous version of the display driver, or even go back to any earlier version. Downloading previous versions is accomplished by selecting the desired version from software component update list box 60. The archived version is then retrieved from software component storage 22 and downloaded to the user.

What's New button 48 functions to display historical information provided by software update server 14 and describes the current and previous versions of the selected software component. If the Verify function has already been performed for a particular software component, the What's New function displays information on the software components determined to be down rev in software component update list box 60. Alternatively, if the Verify function has not been performed for any software component(s) on software update server 14, the What's new function displays information regarding software components on software update server 14.

This function assists the user in determining whether the software component is a desirable software component to download. For example, the user may see from software component update list box 60 that a new version of the operating system software is available. However, the user may know that this new version is known to contain many bugs and hence, does not want this version installed.

Details button 50 functions to display a detailed version checking report and detail all the files checked during the version comparison process. This function can be enabled once the Verify function has been performed and by selecting software component(s) from software component update list box 60.

This function also assists the user in determining whether to replace existing software. As discussed for What's new button 48, if the user is aware that certain software may cause problems with computer system 100, the user may decide to not download the current version.

Setup button 52 functions to invoke a setup property form. When setup button 56 is pressed, a setup property form is displayed. The setup property form includes the following property pages:
1) Connection page—This page allows the connection parameters to the remote software update server(s) 14 to be configured. The connection parameters include the server name and base FTP uniform resource locator (URL) to the internet server or directory on a LAN server. These parameters can be pre-configured and saved in the installation program using an OEM customization kit. In this manner, multiple connections can be defined to multiple servers.

For example, the OEM customization kit may contain a list of software vendors, such as Philips Semiconductors™, Microsoft™ and Compaq™. These vendor's Internet software update server 14 address will be pre-stored. Therefore, if a user wishes to check the status of Philips Semiconductors™ software on computer system 100, the user selects the Philips software update server 14. Alternatively, if a users wishes to check the status of Microsoft™ software on computer system 100, the user selects the Microsoft software update server 14. The default URL can be configured to point to any particular Web server. In the exemplary embodiment, the default URL points to the Philips Semiconductors™ MPC Web server. This allows software update manager 12 to connect to multiple software update servers 14, although only a single software update server 14 can be selected at a time.

2) Download property page—This page allows a folder to be specified where files downloaded from software update server 14 are placed. The download folder can be emptied using an empty button (not shown).

3) Options property page—This page allows the user to select operation options for software update server 14. For example, the options may include:
   a) option to verify all software components or let user select from a list of components to verify.
   b) option to override the installation of software components, i.e. just download and unpackage the software component and let the user manually install the software component.
   c) option to set the duration of a time-out in seconds when trying to connect to an Internet address.
   d) option to display tool tips regarding various user interface components.

3) Security property page—This allows users to enable or disable the checking of digitally signed software components. For example, a user may be concerned that various software may contain viruses that will destroy the user's existing files. In such situations, the user enables an authentication scheme that authenticates these software components. In the exemplary embodiment, software update manager 12 utilizes an existing authentication process via Microsoft AuthenticodeDm to verify the software. Alternatively, any authentication scheme may be used to authenticate the software that will be downloaded to the user.

Figure 5:
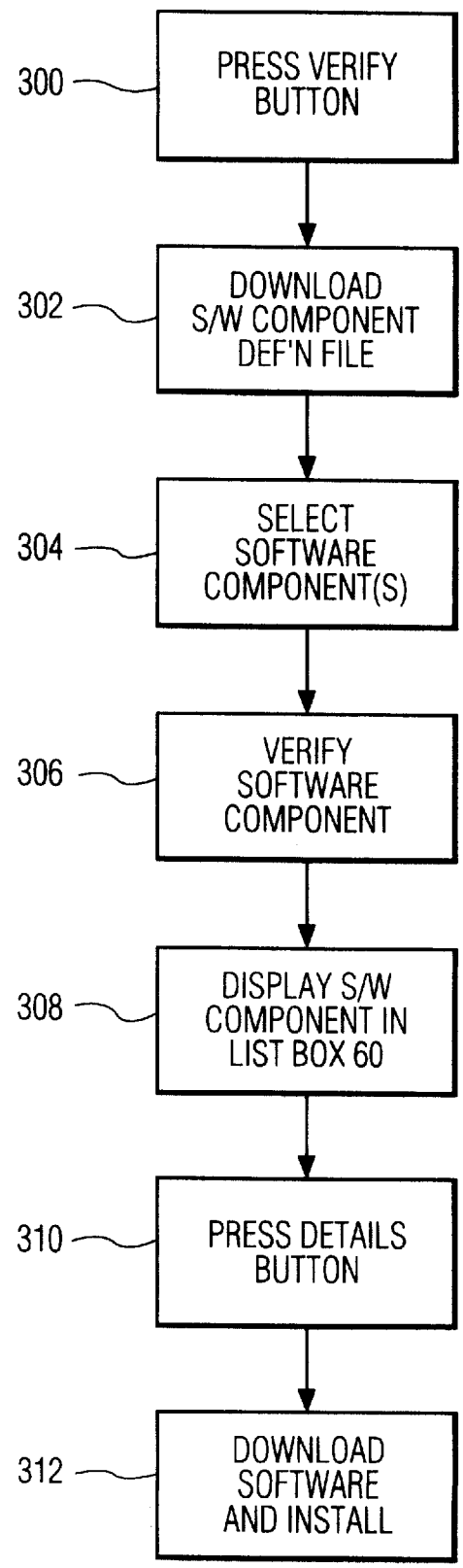
FIG. 5 is a flow diagram illustrating a typical scenario to check/update software in accordance with an embodiment of the invention.

4) Language property page—This page allows a language (English, Spanish, French, etc.) to be selected. The software update manager 12 can be configured to support communication with a user in any language. The selected language will be used in all displays in GUI 16. FIG. 5 is a flow diagram illustrating a typical scenario used to check/update the software on computer system 100. The following scenario assumes that computer system 100 is turned on and running. At step 300, the user presses verify button 42. Processor 102 processes this input and at step 302 connects, via communication interface 118 to software update server 14 via the Internet. In the exemplary embodiment, communication interface 118 is a modem and the connection to software update server 14 is via telephone lines. Assume that the default connection is made to Philips Semiconductors™ software update server 14 within the time set via the setup function. Once the connection has been made, software update server 14 downloads software update definition file 20. The connection status may be displayed in a status bar (not shown) on GUI 16. A file download progress indicator (not shown) may also be displayed as the file is downloaded. If any error occurs during the connection process or file download process, an error message is displayed on GUI 16. The error message is programmed to be displayed for a predetermined period of time. After the software component definition file 20 has been completely downloaded at step 302, software update manager 12 displays in software component update list box 60 the software components stored in software update server 14.

At step 304, the user selects via cursor control 116, a particular one of the software components listed in software component update list box 60. Alternatively, the user can select all of the software components for checking. Next at step 306, software update manager 12 determines if the selected software component on computer system 100 is down rev or nonexistent, by comparing the software component definition file 20 to the local software components. As discussed earlier, software update manager 12 supports multiple methods of verifying software component versions, specified in step 208 via the text editor.

If processor 102 determines that the current version of a software component is down rev or a software component is not installed, the software component(s) is displayed in software component update list box 60, at step 308. Optionally at step 310, the user presses details button 50. Processor 102 processes this input and displays the list of files checked during the verify process and indicates which files will be changed if the user decides to update the software components().

Next at step 312, the user decides to update a software component by selecting a particular component via cursor control 116 and presses update button 44. Processor 102 signals software update server 14 to download the appropriate file(s) stored in software component storage 22 and automatically installs the software component file(s) in storage device 108. In this manner, the user does not have to understand the installation procedure as the process is performed automatically based on the information in software component definition file 20. However, some software component files may not be capable of being automatically installed and the user may have to follow some simple installation instructions.

In this manner, a user is provided a seamless way in which to check and update software. Additionally, the method and apparatus described provide the user with numerous options which facilitate the process. As described above, software update manager 12 can be used to download software over the Internet. However, software update manager 12 can also be used to download information over any LAN, WAN or intranet.

For example, software update manager 12 may be used within a company to stage a product release. In-house users may receive staged releases of a program for testing purposes as the software product is developed. A LAN server may be configured as the software update server 14. In this manner, the latest version will be readily available for in-house users over the LAN software update server 14 for testing purposes. When the software is ready for commercial release, the software may be placed on a software update server 14 available via the Internet.

Software update manager 12 includes an optional scheduler that allows selected software components to be scheduled for periodic updates. This scheduler allows for automatic, periodic checks for down rev software and also for software to be downloaded during non-peak connections times, thereby making the system even more user friendly. The optional scheduler allows software update manager 12 to run in a "quiet mode". In this mode, software update manager 12 starts up and connects to a software update server 14, performs a software component verification and logs the results of the verification. This log file will be read the next time the user runs software update manager 12 or displays an icon to the user, via GUI 16, to indicate that there are pending software component files that may require updating. The user can then decide to update any component files.

Software update manager 12 can also be used with software update servers that require a login. For example, a software update server may be configured to download software only to users who pay for the updated software. In such situations, the user may be prompted to enter a password before the actual software is downloaded.

Described above has been a method and apparatus for checking and updating software. An advantage of the invention is that users are provided a seamless way of both checking and updating software. Users do not have to know the current version of the software that is running on their computers and do not have to navigate through any complex installation procedures. Another advantage of the invention is that users do not have to know the Website address of a software vendor in order to obtain the updated software. A further advantage of the invention is that previous versions of the software can be retrieved in case the new software is problematic.

In this disclosure, there is shown and described only certain preferred embodiments of the invention, but, as aforementioned, it is to be understood that the invention is capable of use in various other combinations and environments and is capable of changes or modifications within the scope of the inventive concept as expressed herein.

What is claimed is:

1. In a computer system containing stored software programs, a method for checking the software programs comprising:

accessing a software component definition file including, for at least one software program on the computer system, (a) an identifier of the at least one software program and (b) a server address for a server containing possible updates for a component of the at least one software program;

selecting via a user input a program from the component definition file;

downloading a file from a remote server at the server address, the file comprising a list of software components corresponding to the selected program;

selecting at least a first software component from the list of software components from the downloaded file; and checking the selected first software component to determine whether said first software component is stored on the computer system, said checking comprising at least one of:

comparing file size, time and date stamp of said first software component and a corresponding software component stored on the computer system, comparing a specified string in said first software component with the specified string in a corresponding software component stored on the computer system; and comparing a version resource contained in said first software component with the version resource of a corresponding software component stored on the computer system; and updating the selected program, substantially independent of an execution of the selected program, based on a result of the checking.

2. The method of claim 1, further comprising:

displaying an indication whether said first software component is stored on the computer system.

3. The method of claim 2, further comprising:

downloading said first software component from the remote server based on said checking step determining that said first software component is not stored on the computer system.

4. The method of claim 3, further comprising:

automatically installing said downloaded first software component on the computer system.

5. The method of claim 3, further comprising:

unpacking and installing said first software component based on control information contained in said downloaded file.

6. The method according to claim 3, further comprising confirming the download, and in the absence of confirmation of the download, not downloading the first software component.

7. The method of claim 1, wherein checking the selected first software component further comprises:

checking said first software component based on control information contained in the downloaded file.

8. The method according to claim 1, wherein said component software definition file is a text file.

9. The method according to claim 1, further including accessing the remote server at a time removed from the selecting of the program.

10. The method according to claim 9, wherein accessing the remote server is carried out recurrently at times specified by a user.

11. A computer-readable medium having stored thereon a plurality of sequences of instructions, said plurality of sequences of instruction including sequences of instructions which, when executed by a processor, cause said processor to perform the steps of:

accessing a software component definition file including, for at least one software program on a computer system, (a) an identifier of the at least one software program and (b) a server address for a server containing possible updates for a component of the at least one software program;

selecting via a user input a program from the component definition file;

downloading a file from a remote server at the server address, the file comprising a list of software components corresponding to the selected program;

selecting at least a first software component from the list of software components from the downloaded file; and checking the selected first software component to determine whether said at least first software component is stored on the computer system, said checking comprising at least one of:

comparing file size, time and date stamp of said first software component and a corresponding software components stored on the computer system;

comparing a specified string in said first software component with the specified string in a corresponding software component stored on the computer system; and comparing a version resource contained in said first software component with the version resource of a corresponding software component stored on the computer system; and updating the selected program, substantially independent of an execution of the selected program, based on a result of the checking.

12. The computer-readable medium of claim 11, causing said processor to perform the further step of:

displaying an indication whether said first software component is stored on the computer system.

13. The computer-readable medium of claim 12, causing said processor to perform the further step of:

downloading said first software component from the remote server based on said checking step determining that said first software component is not stored on the computer system.

14. The computer-readable medium of claim 13, causing said processor to perform the further step of:

automatically installing said downloaded first software component on the computer system.

15. The computer-readable medium of claim 13, wherein the checking step further comprises:

unpacking and installing said first software component based on control information contained in said downloaded file.

16. The computer readable medium according to claim 13, further comprising confirming the download, and in the absence of confirmation of the download, not downloading the first software component.

17. The computer-readable medium of claim 11, wherein the checking step further comprises:

checking said first software component based on control information contained in the downloaded file.

18. The computer readable medium according to claim 11, wherein said component software definition file is a text file.

19. The computer readable medium according to claim 11, further including accessing the remote server at a time removed from the selecting of the program.

20. The computer readable medium according to claim 19, wherein accessing the remote server is carried out recurrently at times specified by a user.

21. A computer system, comprising:

a memory configured to store software programs;

a communications device configured to communicate with a remote server; and a software checking device configured to:

access a software component definition file including, for at least one software program on the computer system, (a) an identifier of the at least one software program and (b) a server address for a server containing possible updates for a component of the at least one software program;

select via a user input a program from the component definition file;

establish communications with the remote server at the server address via the communications device, download a file from the remote server, the file containing a list of software components corresponding to the selected program, determine whether a first software component from the list of software components of the downloaded file is stored in the memory by at least one of:
 (a) comparing file size, time and date stamp of said first software component and a corresponding software components stored on the computer system;
 (b) comparing a specified string in said first software component with the specified string in a corresponding software component stored on the computer system; and
 (c) comparing a version resource contained in said first software component with the version resource of a corresponding software component stored on the computer system; and download said first software component from the remote server, substantially independent of an execution of the selected program, based on the software checking device determining said first software component is not stored in the memory.

22. The computer system according to claim 21, wherein said component software definition file is a text file.

23. The computer system according to claim 21, further including accessing the remote server at a time removed from the selecting of the program.

24. The computer system according to claim 23, wherein accessing the remote server is carried out recurrently at times specified by a user.

25. The computer system according to claim 21, further comprising confirming the download, and in the absence of confirmation of the download, not downloading the first software component.

* * * * *